United States Patent [19]
Farjh et al.

[11] Patent Number: 5,341,401
[45] Date of Patent: Aug. 23, 1994

[54] METHOD OF DETECTING THE CHANNEL IDENTITY OF A NUMBER OF CHANNELS IN A MOBILE RADIO SYSTEM

[75] Inventors: Jan F. Farjh, Enskede; Jon K. Ugland, Sundbyber, both of Sweden

[73] Assignee: Telefonaktiebolaget L M Ericsson, Stockholm, Sweden

[21] Appl. No.: 942,443

[22] Filed: Sep. 9, 1992

[30] Foreign Application Priority Data

Sep. 10, 1991 [SE] Sweden .................... 9102611

[51] Int. Cl.⁵ .......................... H04L 27/06
[52] U.S. Cl. ........................ 375/94; 375/10; 371/43
[58] Field of Search ............ 375/10, 34, 39, 94; 371/37.9, 43-45

[56] References Cited

U.S. PATENT DOCUMENTS 4,500,994  2/1985  McCallister et al. ............ 371/43
4,578,800  3/1986  Yasuda et al. ............... 375/106
5,157,672 10/1992  Kondou et al. ............... 371/43

OTHER PUBLICATIONS

EIA-TIA Interim Standard IS-54, p. 7 (Jan. 1991).
EIA-TIA Interim Standard IS-54A, p. 61 (Jan. 1991).
EIA-TIA Interim Standard IS-54A, pp. 57-67 (Jan. 1991).
EIA-TIA Interim Standard IS-54A, pp .130-134 (Jan. 1991).
R. E. Blahut, "Theory and Practice of Error Control Codes", Addison Wesley Publishing Company, ISBN 0-201-10102-5, pp. 347-388 (1983).
G. D. Forney, "The Viterbi Algorithm", Proceedings of the IEEE, vol. 61, No. 3, pp. 267-278 (Mar. 1973).

Primary Examiner—Stephen Chin
Assistant Examiner—Young Tse
Attorney, Agent, or Firm—Burns, Doane, Swecker & Mathis

[57] ABSTRACT

A method of detecting the identity of a radio channel and to ascertain whether the channel is a control channel or a traffic channel, in conjunction with convolution decoding in a mobile radio receiver. Channel identification is effected without such complete decoding. Part of a data block is decoded in accordance with the Viterbi algorithm as though the block represented a control channel. If the metric obtained after a given number of nodes is smaller than a given number of threshold values, the channel is considered to be a control channel and is thereafter decoded as such a channel. If the metric is greater than the threshold value, the channel is decoded as a speech channel.

7 Claims, 5 Drawing Sheets

METHOD OF DETECTING THE CHANNEL IDENTITY OF A NUMBER OF CHANNELS IN A MOBILE RADIO SYSTEM

TECHNICAL FIELD

The present invention relates to a method for detecting the identity of one radio channel of a given number of radio channels in a mobile radio system. More specifically, the invention relates to detecting whether a received radio channel is a speech channel or a control channel.

BACKGROUND OF THE INVENTION

In a mobile radio system which operates according to the TDMA principle, i.e., the different radio channels are time divided in different time slots and different carrier frequencies, where one radio channel occupies a given time slot and a given frequency, there is a need to be able to establish the identity of a given radio channel. The radio channel may, for instance, be an access channel, a control channel or (as is most usual) a traffic channel. It is known to introduce into the time slot a special bit field which states this identity.

In a mobile radio system, radio signals are transmitted in the different channels over media which can give rise to errors in the information transmitted and thus also in errors in the bit field denoting channel identity. The errors are caused by the properties of the radio media, such as errors caused by fading and multipath propagation.

In order to correct these transmission errors, so-called channel coding is introduced in channel transmission, which involves the addition of further bits to the information bits. This block of bits being coded in accordance with a given code prior to transmission over the radio medium. An example of one such code is the so-called convolution code for code-word lengths of 2-10 bits, where the bits in a code-word are dependent on the bits in preceding code-words. A given code, for instance a convolution code, is generated with the aid of a generator polynomial or a code polynomial of the kind $$g(x) = 1 + a_1 x + a_2 x^3 + .. a_n x^n$$

where some of the coefficients $a_1, ..., a_n$ are $=0$.

The introduction of redundant bits and/or code information bits with the aid of generator polynomials apparently causes the block length to grow and requires greater processor capacity both when channel coding in the transmitter and when channel decoding in the receiver. This problem is most noticeable when receiving in a mobile station in which the requisite processor capacity for channel decoding must not be too high.

Another known method of distinguishing between the identities of different radio channels involves the use of different coding schedules when channel coding. For instance, the aforesaid convolution coding can be used, although with different rates for the speech channels and the control channels respectively. Generally, the code rate is defined as $$R = k/n,$$

where k = the number of information bits in each code-word and n = the number of bits in each code-word. According to the above, a given value R1 can be used for coding the speech channels and another value R2 can be used for coding the control channels.

This known method involves the necessity of completely decoding all candidates and the selection of the channel which passes the error discovery test. Although this method is reliable, the problem of high complexity upon reception in a mobile station remains.

SUMMARY OF THE DISCLOSURE

The present invention is based on the fundamental concept of detecting the identity of a channel without effecting complete decoding of all channel alternatives for a given incoming radio channel. Upon completion of this channel identification process and after having established the identity of the channel (although with a given small error probability) complete decoding of the identified channel is carried out.

In the following, the inventive concept is limited to convolution decoding in accordance with the so-called Viterbi algorithm, wherein it is assumed that the incoming channels are convolution coded at different rates, depending on whether a channel is a speech channel or a control channel.

According to the invention, part of a data block is first decoded as though this block represented a control channel (FACCH). The accumulated metric is taken after a given number of nodes in the Viterbi algorithm as a criterion of whether or not the decoding is correct. If this metric is smaller than a given threshold value, the identity of the channel is considered to be FACCH and the data block is decoded as a control channel. It is also possible to begin the shortened decoding process as though the incoming data block was a speech channel (UCH).

According to a further development for the case when the metric is greater than the threshold value after said number of nodes, the data block is decoded as though it represented a speech channel when the first decoding process was effected for a control channel, and vice versa. The metric for the first decoding process is stored and the difference between this stored metric and the metric obtained from the later decoding process after the same number of nodes is compared with a threshold value. If this difference is smaller than the threshold value, the data block is decoded as a control channel (FACCH) and otherwise as a speech channel (UCH).

The object of the present invention is to provide a method for detecting the channel identity of a radio signal, preferably a radio signal arriving at a mobile station, containing radio channels of different identity, by applying convolution decoding in accordance with the Viterbi algorithm, although with a decoding and identification process which is less complicated than known decoding/identification processes.

BRIEF DESCRIPTION OF THE DRAWINGS

The present invention will now be described in more detail with reference to the accompanying drawings, in which:

FIG. 6 is a diagram explaining the inventive method;

DETAILED DESCRIPTION OF THE PREFERRED EMBODIMENTS

Figure 1:
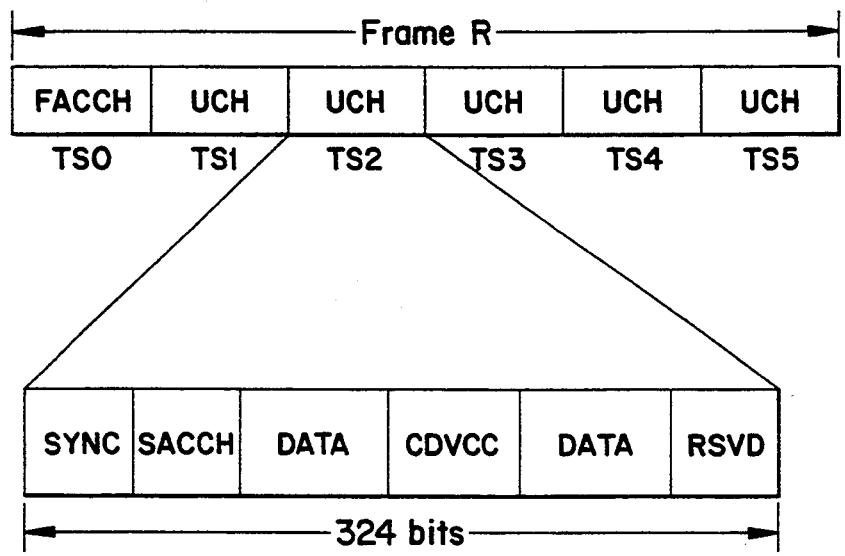
FIG. 1 is a schematic illustration of a frame and a time slot in a TDMA-system.

FIG. 1 illustrates the format of a frame R according to the standard which will be applied primarily in North America (U.S.A., Canada) and which is described in more detail in EIA-TIA Interim Standard IS-54, January 1991, page 7.

The frame R contains six time slots TS0–TS5, each of which can represent a radio channel, either a control channel FACCH or a speech channel UCH. In the illustrated case, the frame R contains 5 speech channels UCH and only one control channel. FIG. 1 also illustrates the format of a speech channel UCH, having a field SYNC for synchronizing the burst in time slot TS2 and a field SACCH for transmitting so-called slow associated control messages SACCH (e.g. a measuring result), and also two data parts DATA for transmission of speech information, a part CDVCC (coded digital verification color code) for transmission of a color code, and a part RSVD.

A control channel FACCH (time slot TS0) is organized in the same way as a speech channel UCH, although in this case the DATA-part represents control information or some other information (e.g. message concerning handover) instead of speech information. The bursts in respective time slots have a length of 324 bits.

Figure 2:
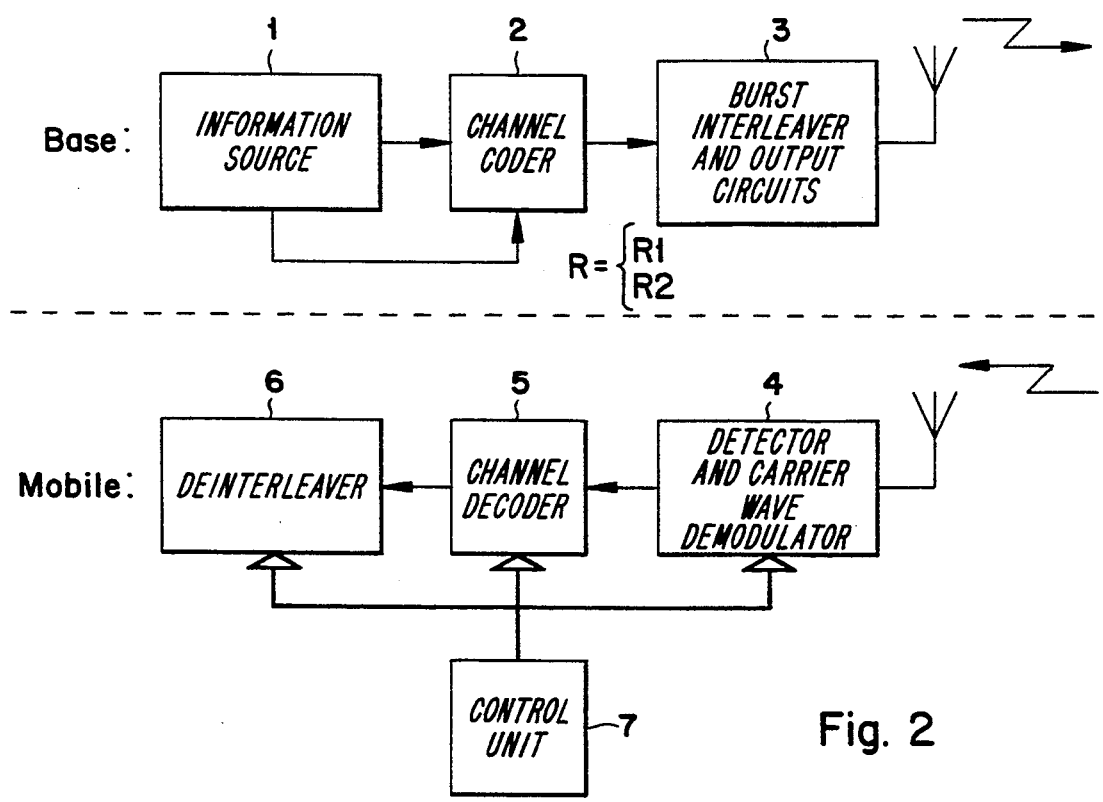
FIG. 2 is a block schematic of certain transmitting and receiving units in a base station and mobile station respectively in a mobile radio system.

FIG. 2 illustrates certain transmission units in one of the base stations of the mobile radio system, and certain receiver units in a mobile station. An information source 1 which contains, among other things, speech coders, transmits a bit stream which represents either speech information or control information and which is intended to be received by a given mobile station. This bit stream is coded in a channel coder 2 with a given convolution code in accordance with the aforegoing, so that it can be detected correctly in the receiving mobile station in spite of imperfections in the radio medium.

In a radio transmitter for which the inventive method shall be used, coding is effected in the channel coder 2 by means of a convolution code at a given rate, this rate depending on whether the coded data represents a speech channel or a control channel. Thus, the channel coder is controlled from the information source 1 such that a) when the bit stream arriving at the coder 2 represents a speech channel, the rate R is equal to $\frac{1}{2}$, whereas b) when the bit stream represents a control channel, the rate R is equal to $\frac{1}{4}$.

The channel-coded bit stream is then delivered to a block 3 which represents burst interleaver, burst generator, carrier wave modulator and output circuits, in a known manner.

The radio signal transmitted from the base station is received in the receiver circuits of the mobile station by a block 4 which represents carrier wave demodulator, equalizer, symbol detector, de-interleaver, in a known manner. Channel decoding is the effected in the channel decoder 5. A block 6 represents a de-interleaver and retrieves information in the mobile station. A block 7 represents a control unit, i.e., a microprocessor, for the mobile station.

In known channel decoders, each data block (burst) is decoded in accordance with all alternatives. Thus, convolution decoding at the rate $R = \frac{1}{2}$ is primarily carried out to enable a speech channel to be decoded. If this decoding process did not produce the correct result (CRC-control), convolution decoding is instead carried out at a rate of $R = \frac{1}{4}$, in order to decode a control channel. In this case, an incoming burst is decoded completely before its identity (FACCH or UCH) can be established.

Figure 3:
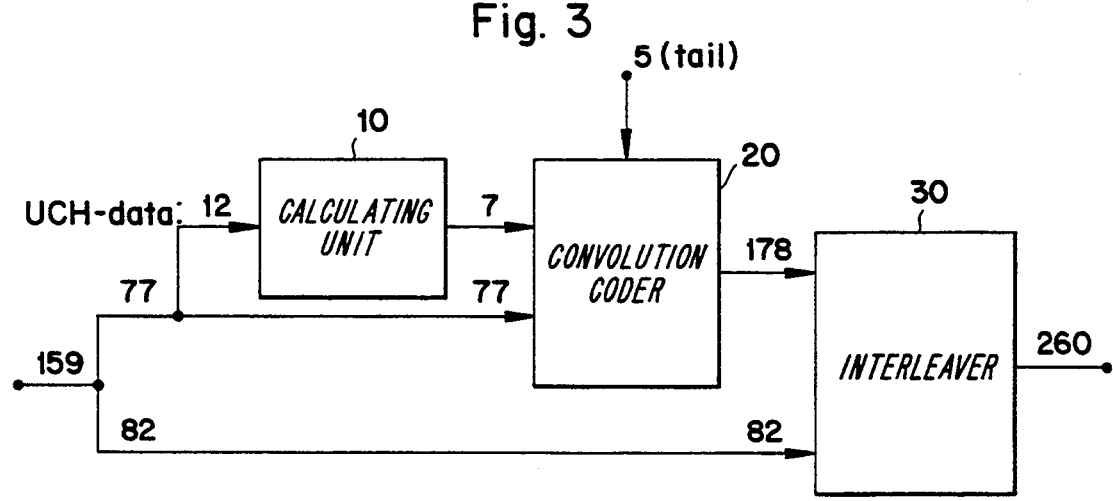
FIG. 3 is a block schematic which illustrates a known method of channel coding when transmitting a speech channel.

FIG. 3 illustrates in more detail convolution coding of UCH-data with so-called cyclic redundancy check (CRC). 159 bits arrive in a UCH-block from the speech coder in the mobile. The 12 most significant bits are applied to a calculating unit 10, which from the given generator polynomials calculates 7 new bits from the incoming 12 bits. These 7 bits and 77 bits from the 159 incoming bits are convolution coded in a convolution coder 20 at a rate of $R = \frac{1}{2}$. The remaining 8.32 bits of the 159 incoming bits and the 178 bits obtained from the coder 20 are interleaved in the interleaver 30, therewith obtaining a total of 260 bits from the coding unit shown in FIG. 3. The aforesaid process is described in Interim Standard EIA/TIA-IS54-A, page 61.

Figure 4:
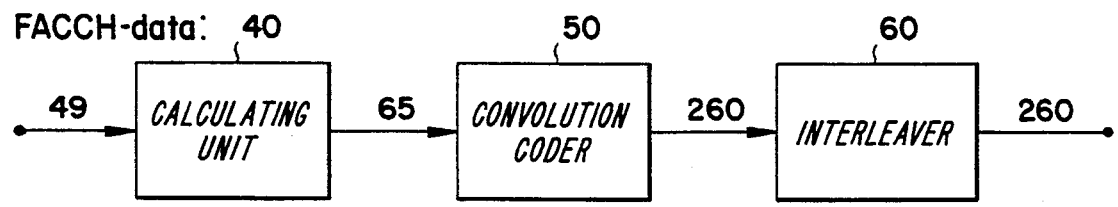
FIG. 4 is a similar block schematic illustrating channel coding of a control channel.

FIG. 4 illustrates a coding unit for FACCH-data in more detail. The FACCH-generator of the mobile sends 49 bits in a FACCH-block to the coding unit. This unit includes a calculating unit 40 for calculating 16 CRC-bits (cyclic redundancy check) with the aid of given generator polynomials. The thus formed 65 bits are sent to a convolution coder 50 at a rate $R = \frac{1}{4}$ and thereafter to an interleaver 60, which similar to the coder in FIG. 3, delivers 260 bits to the burst generator of the mobile (possible via a modulo-2-adder for data encryption). The aforegoing is described in Interim Standard EIA/TIA-IS54-A, pages 57–67 (for UCH) and pages 130–134 (for FACCH).

There is used in the receiver of the mobile station a channel decoder 5 (FIG. 2) which performs convolution decoding in accordance with the Viterbi algorithm. This algorithm is previously known and is described, for instance, in 1) "Theory and Practice of Error Control Codes" by Richard E. Blahut (Addison Wesley Publishing Company, ISBN 0-201-10102-5, pp. 347–388, and also in 2) "The Viterbi Algorithm" by G. David Forney, Jr. (Proceedings of the IEEE, Vol. 61, No. 3, Mar. 1973, pp. 268–278. A full description of this algorithm will not be given here.

The Viterbi algorithm includes a "metric" which discloses the extent to which the received bits differ from the transition bits obtained from the trellis diagram for the convolution coder used. The trellis diagram is obtained from a given coder, as will be evident from FIG. 12.3 of reference 1) above. At the transition from one node to the next node in the trellis diagram, there is obtained a delta-metric which discloses the extent to which the bits received differ from the bits given in the trellis diagram at the transition, or junction, of one node to the next node.

Figure 5:
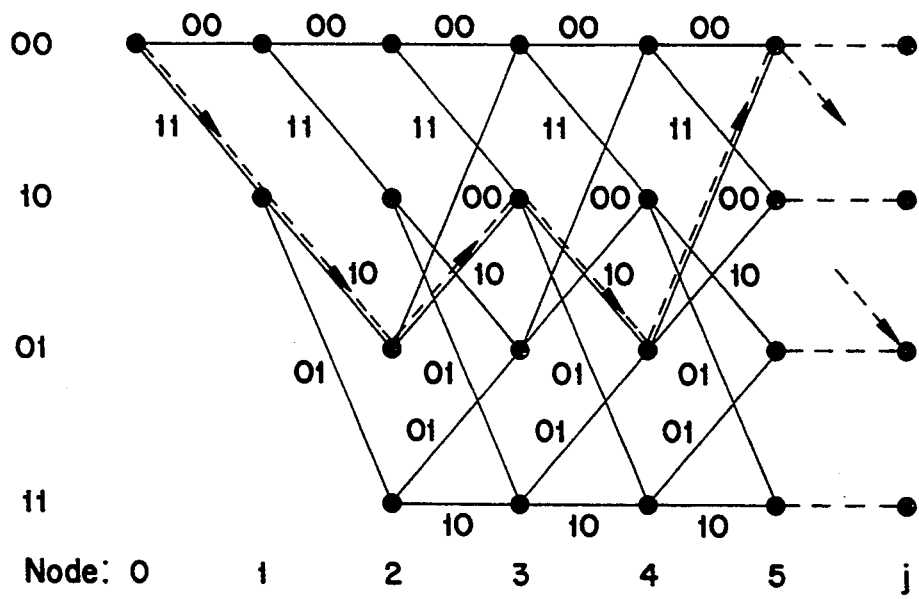
FIG. 5 illustrates schematically the states and nodes when decoding in accordance with the Viterbi algorithm.

FIG. 5 illustrates a simple trellis diagram for a (2, 1) convolution code and having only four states. In practice, there is used a decoder that has 32 states. The simplified trellis diagram is only intended to illustrate the decoding principle and how this principle is applied in conjunction with the present invention.

As is known, decoding involves an investigation as to the number of routes, or paths, that are possible through the trellis diagram on the basis of received code-words 00, 01, 10 and 11. This investigation is carried out node-for-node until a complete data block has been decoded. This data block includes 260 bits in the case of FACCH and 178 bits in the case of UCH (according to FIGS. 3 and 4) and each code-word is 4 bits and 2 bits respectively. At the junction from one node to the next node, there is obtained a given "part metric" which is defined as the difference between the decoded code-word according to the trellis diagram and the codeword received. When the complete block has been decoded, there is obtained a given "path" through the trellis diagram with the least accumulated metric $m_j$ after j nodes, and corresponding detected bits are considered to be the most probable transmitted bits in the data word. The most optimum path has been drawn in broken lines in FIG. 5, by way of example.

According to the proposed method, decoding of a 260-bit data word or a 178-bit data word is interrupted before all bits have been decoded, i.e. $j<89$ in the case of UCH or $j<65$ in the case of FACCH, in accordance with the example, thereby obtaining an accumulated minimum metric $m_j$ corresponding to the broken-line path in FIG. 5.

If a data block containing FACCH-data has been decoded at a rate $R=\frac{1}{2}$ with which UCH-data has been coded on the transmission side, the accumulated metric $m_j$ should increase more node-for-node than if the same FACCH-data had been decoded at the rate $R=\frac{1}{4}$ used when coding the same FACCH-data. Similarly, the metric $m_j$ should increase more node-for-node than when UCH-data is decoded at a rate $R=\frac{1}{4}$.

The FIG. 6 diagram illustrates the accumulated minimum metric distribution when decoding a FACCH/UCH-word. The diagram illustrates distribution of accumulated minimum metrics and of the four possible decodings in ($R=\frac{1}{4}$ and $\frac{1}{2}$ respectively).
1. FACCH-data decoded by a FACCH-decoder ($R=\frac{1}{4}$).
2. UCH-data decoded by a FACCH-decoder.
3. FACCH-data decoded by a UCH-decoder ($R=\frac{1}{2}$).
4. UCH-data decoded by a UCH-decoder.

As expected, the diagram shows that the accumulated metric is smallest for decoding according to 1 and 4, since respective data blocks have been decoded at the correct rate ($R=\frac{1}{4}$ and $\frac{1}{2}$ respectively). It can also be seen that the difference in the metric between 2 and 4 is greater than that between 1 and 3. According to the proposed method, an incoming FACCH/UCH-block, or a part thereof, is first hard-decoded as though the block were comprised of FACCH-data, i.e., at a rate $R=\frac{1}{4}$.

Figure 7:
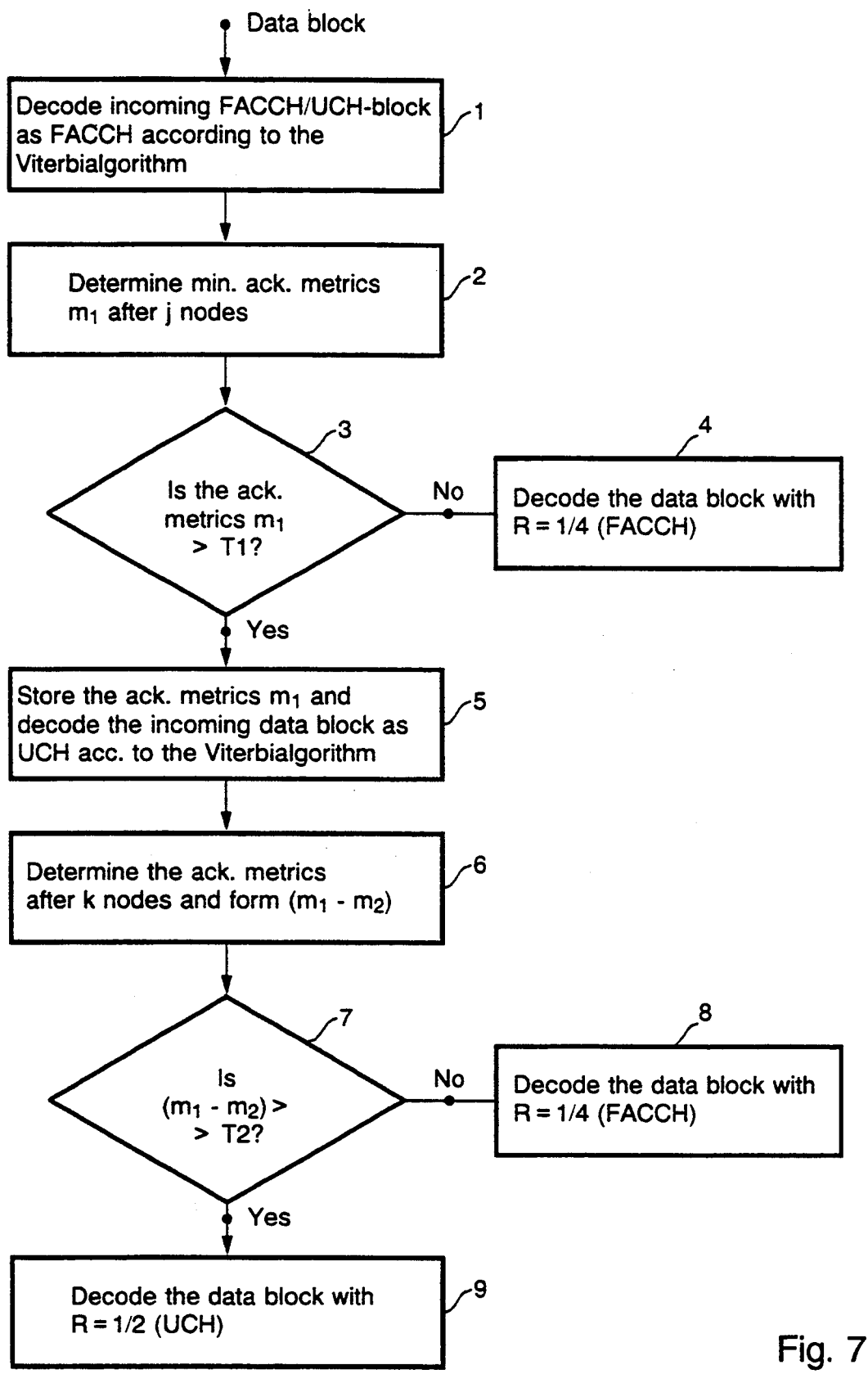
FIG. 7 is a flow sheet illustrating the inventive method.
Figure 7:
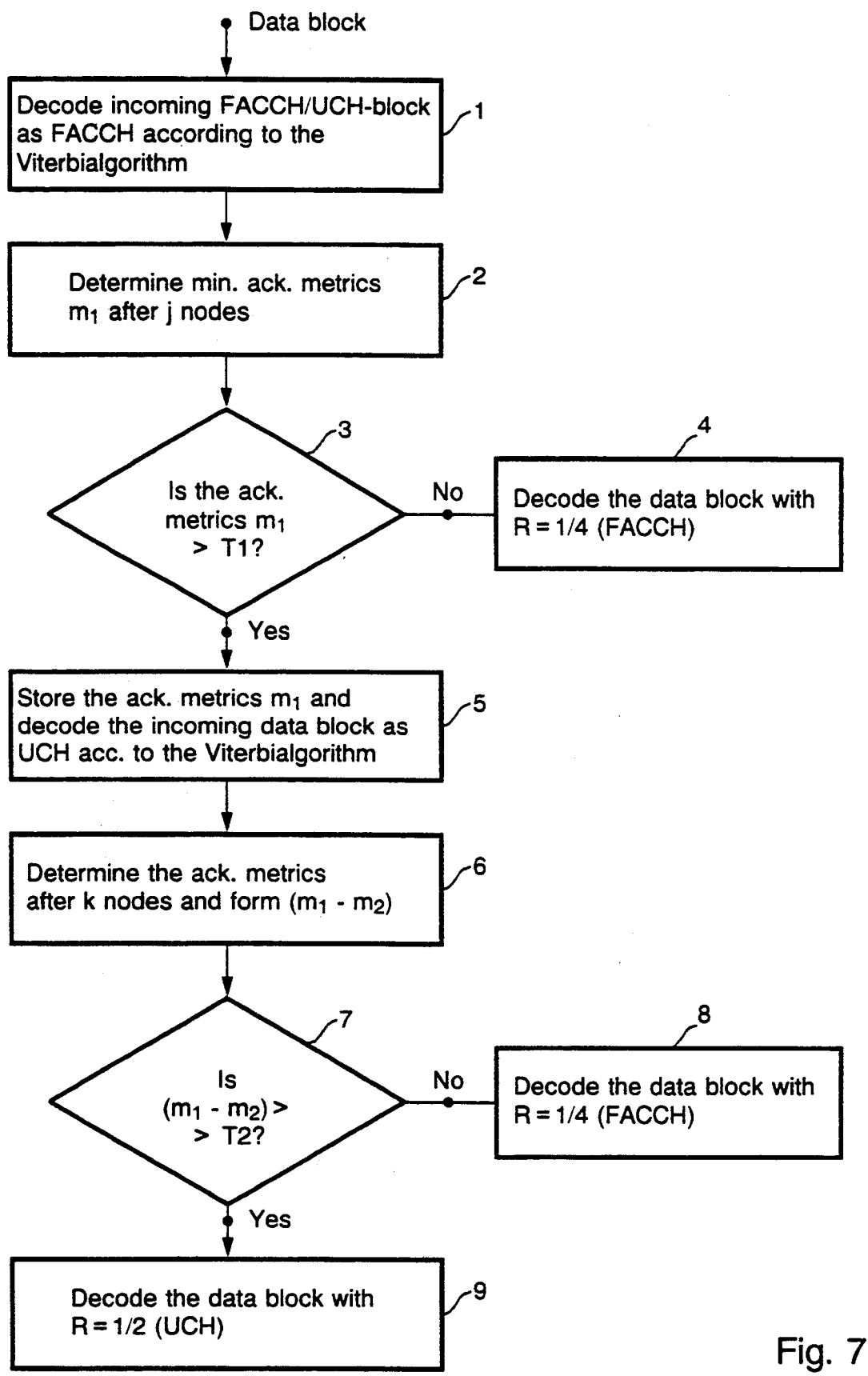

The flow sheet shown in FIG. 7 illustrates how decoding is effected in accordance with the proposed method. Thus, according to block 1 of FIG. 7, decoding of j nodes in the FACCH/UCH-data block is effected, where j<total number of nodes in the decoder, and in accordance with the Viterbi algorithm (FIG. 5).

The smallest accumulated metric $m_1=(m_j)$ min. is determined after j nodes. A threshold value T1 and a further threshold value T2 are predetermined by, for instance, simulations, so as to obtain a minimum error probability. The value $m_1$ is then compared with the threshold value T1, block 3. If $m_1<T1$ ("No"), this implies that the data received can be definitely considered to be FACCH-data, and the FACCH-data block is decoded. Preferably, so-called soft-decoding is now applied, which involves weighting the received bits with a value which is proportional to the probability of the bits being correctly detected. The decoding rate is $R=\frac{1}{4}$ in the case of FACCH-data, block 4.

The value of $m_1$ is stored when $m_1$ is $>T1$ ("Yes"), and the data block is decoded as though it were a UCH-data block, i.e. $R=\frac{1}{2}$. In this case, decoding can be effected with a different number of nodes k than the preceding decoding process for j nodes. However, it is preferred to decode for the same number of nodes (k=j) in the trellis diagram as for FACCH, blocks 5 and 6. In this latter decoding process, i.e. for $R=\frac{1}{2}$, there is obtained a new smallest value $m_2$ of the accumulated metric $m_k$ and the difference ($m_1-m_2$) is formed, block 6.

According to block 7, a comparison is now made when the difference ($m_1-m_2$) is greater than or smaller than the second predetermined threshold value T2. If ($m_1-m_2$)<T2 ("No") the data block is decoded as though it were a FACCH-data block (R $\frac{1}{4}$), block 8. Decoding is either carried out from the beginning of the block or from, and including, the node k. In the former case, soft decoding is preferably used while in the latter case only hard decoding is used. If ($m_1-m_2$)>T2 ("Yes"), the data block is decoded as though it were a UCH-data block ($R=\frac{1}{2}$), block 9. Decoding is either effected from the beginning of the block or from, and including, the node k, with the aid of soft and hard decoding processes respectively, as in the case of a FACCH-data block. Similar to the aforegoing (blocks 4 and 5), soft-decoding is used in the complete decoding of the FACCH/UCH-block.

Figure 8:
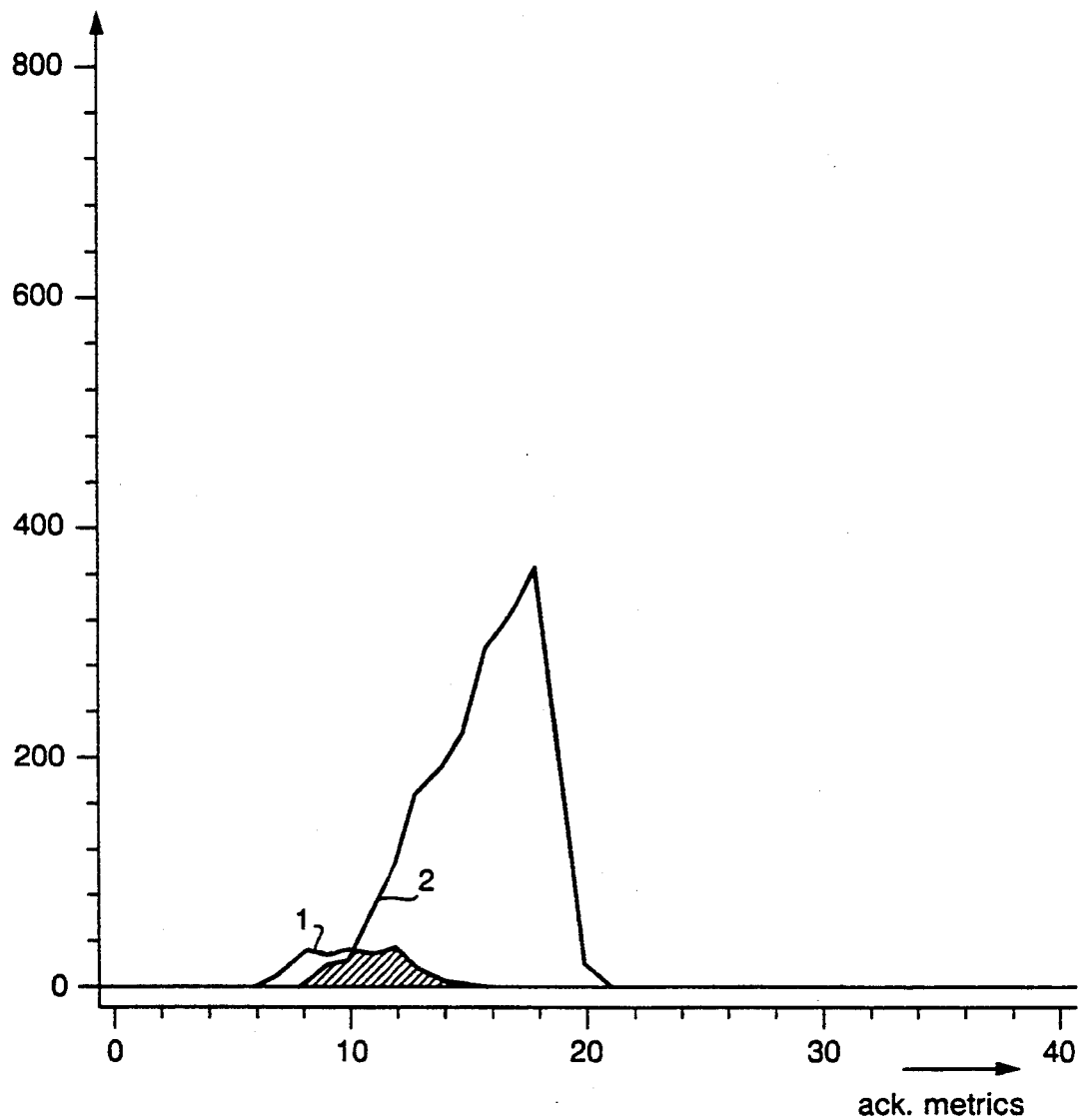
FIG. 8 is a further diagram which further explains the inventive method.

The diagram according to FIG. 8 illustrates the distribution of the difference ($m_1-m_2$), where
1. shows the metric distribution for the FACCH-data, and
2. shows the metric distribution for UCH-data.

A comparison of the FIG. 8 diagram with the FIG. 6 diagram shows that the error probability (respective hatched areas) has decreased. Thus, decoding can be further improved by forming the difference ($m_1-m_2$) and comparing this difference with the threshold value T2.

While the invention has been described in its preferred embodiments, it is to be understood that the words that have been used are words of description rather than of limitation and that changes within the purview of the appended claims may be made without departing from the true scope and spirit of the invention in its broader aspects.

We claim:
1. A method for detecting the channel identity of a number of channels in a mobile radio system in which each channel is represented by a time slot and in which a number of channels to be identified are represented by a corresponding number of time slots Included in a frame, wherein at least one channel of a first identity and remaining channels in the frame of a second identity are channel coded by means of convolution coding at a first rate and a second rate respectively so that when correspondingly channel decoding in a receiver having a corresponding convolution code according to the Viterbi algorithm, the channel separated in said first identity and said second identity, wherein a given data part in an incoming burst, which may represent a chan- nel of either said first or said second identity is decoded by convolution decoding at a rate which corresponds to the rate at which the first identity was coded, thereby to obtain a given accumulated metric after a first number of nodes in the Viterbi algorithm, and in that value of said metric is compared with a given threshold value wherein when the accumulated metric is less than the threshold value, data in the burst is decoded at the rate which corresponds to channels of the first identity.

2. A method for detecting the channel identity according to claim 1, wherein the incoming burst is decoded by convolution coding at a rate which corresponds to the rate at which the second identity was coded, thereby to obtain a second given accumulated metric after a second number of nodes in the Viterbi algorithm; in that the different between said metrics from the convolution decoding at said first and said second rates respectively is formed and compared with a second threshold value wherein, a) if the difference is smaller than the second threshold value, the remainder of the burst is decoded at a rate which corresponds to said first channel identity, whereas if, b) the difference is greater than the second threshold value, the remainder of the burst is decoded at the rate which corresponds to said second channel identity.

3. A method according to claim 2, wherein said first number of nodes is equal to said second number of nodes.

4. A method according to claim 2, wherein decoding after said comparison is commenced from the beginning of a data block.

5. A method according to claim 2, wherein after said comparison, decoding is commenced from, and including, the node that is located after said second number of nodes.

6. A method according to claim 4, wherein decoding is effected by soft-decoding.

7. A method according to claim 5, wherein decoding is effected by hard-decoding.

* * * * *